United States Patent

[11] 3,612,369

[72] Inventors Robert Karl Grebe
Hershey;
Robert Ullman, Harrisburg, both of Pa.
[21] Appl. No. 876,639
[22] Filed Nov. 14, 1969
[45] Patented Oct. 12, 1971
[73] Assignee AMP Incorporated
Harrisburg, Pa.

[54] WIRE FEED FOR LEAD MAKING MACHINE
5 Claims, 11 Drawing Figs.
[52] U.S. Cl. .................................................. 226/24,
226/115
[51] Int. Cl. ........................................................ B65h 23/18
[50] Field of Search .......................................... 226/117,
156, 33, 43, 9, 24, 37–39, 108, 111, 115; 33/129,
132, 133, 132.5

[56] References Cited
UNITED STATES PATENTS
3,270,930 9/1966 Emerson .................. 226/43 X
3,394,853 7/1968 Foley ........................ 226/33 X
3,411,216 11/1968 Evans ....................... 33/129

*Primary Examiner*—Richard A. Schacher
*Attorneys*—Curtis, Morris and Safford, Marshall M. Holcombe, William Hintze, William J. Keating, Frederick W. Raring, John R. Hopkins, Adrian J. La Rue and Jay L. Seitchik ABSTRACT: Wire feeding and measuring means for lead making machine comprises capstan which withdraws the wire from a reel or barrel during a major portion of the operating cycle and a set of high speed rolls which operate during only a minor portion of the cycle. Wire is measured and accumulated by the capstan and the measured and accumulated wire is then fed into the machine during the minor portion of the cycle by the high speed rolls. The capstan is controlled by means of a pulse generator which generates a series of pulses in response to the feeding of the wire, the number of pulses generated having a fixed ratio to the length of wire fed. The pulses are transmitted to a counter/controller which controls a printed circuit motor that drives the capstan. The counter can be preset to stop the printed circuit motor after a predetermined length of wire has been fed for a single operating cycle.

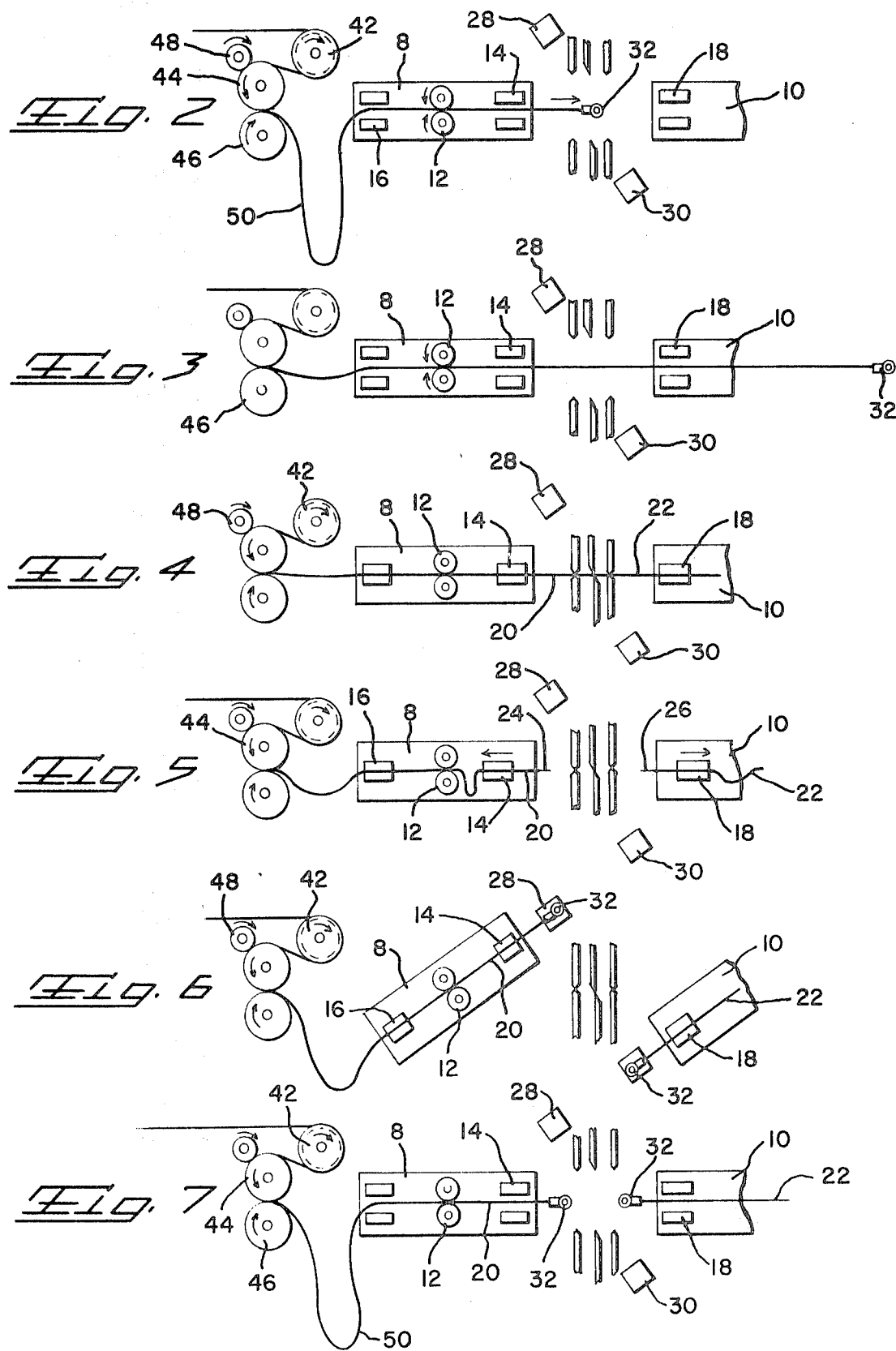

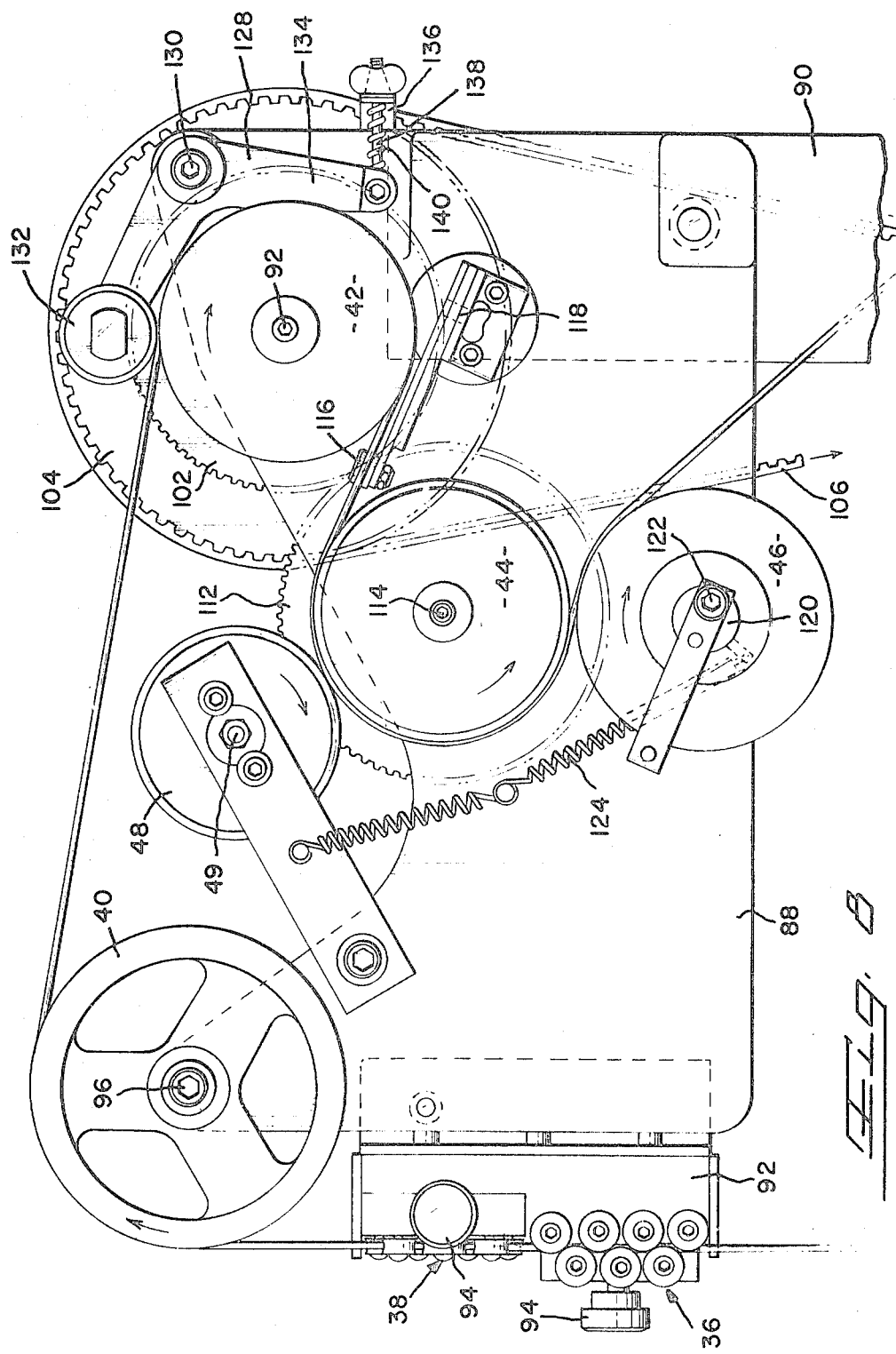

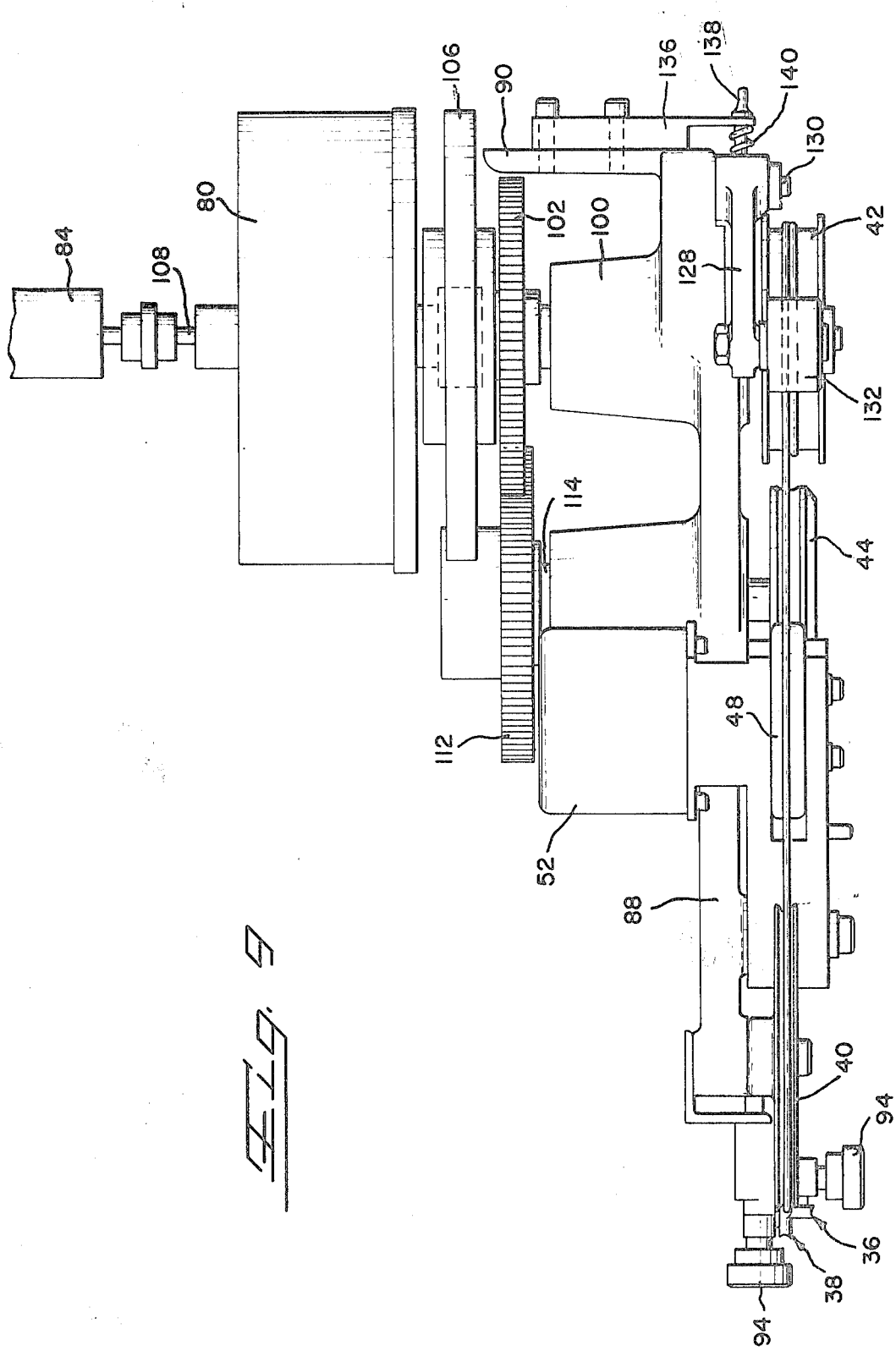

WIRE FEED FOR LEAD MAKING MACHINE

BACKGROUND OF THE INVENTION

The present invention is directed to a wire measuring and feeding means which is capable of feeding, during a brief time interval, an accurately metered length of wire drawn from an endless source such as a reel or barrel. The invention is herein disclosed in an environment including an automatic lead making machine of the general type disclosed in U.S. Patent to Schwalm et al. 3,019,679 although other uses for the invention will be apparent to those skilled in the art.

During an operating cycle of a lead making machine of the general type in the Schwalm et al. patent, a predetermined length of wire is fed through, and beyond, a cutting and stripping zone, a lead is cut from the end of the wire, the insulation is stripped from the trailing end of the lead and from the leading end of the wire, and terminals are crimped onto the stripped ends. Machines of this type are frequently operated at speeds of 3600 cycles per hour and higher and leads of up to 10 feed in length are commonly produced. Machines of this type have found wide acceptance in the electrical industry and are used to produce a variety of types of electrical leads.

During the operation of a lead making machine of the Schwalm et al. type, the wire can be fed through the machine during only the minor portion of the operating cycle when the wire cutting and insulation cutting blades are separated from each other and prior to commencement of the insulation stripping and terminal applying operations. The time available for feeding wire during a single operating cycle is thus quite short, the total cycling time of the machine often being of the order one second. Notwithstanding the brief time interval which is available for the wire feeding operation, it is nonetheless desirable to accurately meter the length of wire fed so that leads of precisely predetermined lengths will be produced during operation of the machine.

The known method of metering and feeding wire for such machines is shown in U.S. Pat. No. 3,098,596, and comprises a continuously operating capstan which, during a time interval representing the complete operating cycle of the machine, withdraws wire from a barrel or reel and accumulates the withdrawn wire as a loop. During the brief interval during which the machine is receptive to wire, a pair of high speed feed rolls engage the wire and project it through the machine. It will be apparent that the speed of the capstan must be accurately and precisely controlled if precisely predetermined lead lengths are to be manufactured by the machine.

In the past, the capstan has been controlled by a mechanical linkage extending to the lead making machine, itself as shown in U.S. Pat. No. 3,098,596. In that patent, the capstan is mounted on a shaft extending from a conventional sliding gear transmission which in turn is coupled by a sprocket and chain to an infinitely variable transmission. The infinitely variable transmission is, in turn, coupled by a sprocket and chain to the main power shaft of the lead making machine. Leads of any desired length, within limits, can be produced by selection of the proper gear ratio in the sliding gear transmission and the proper setting in the infinitely variable transmission mechanism, however, a fairly high degree of skill is required to make the necessary changes and the time required to make the changes is relatively long resulting in lost production time on the lead making machine itself. Furthermore, the mechanical control system for the measuring and feeding means of U.S. Pat. No. 3,098,596, does not yield the precision in the lengths of the leads produced that would be desirable in at least some industries. Experience has shown for example, that where leads having a nominal length of 10 feet are being produced, the actual lengths will vary between 9 feet 11 inches and 10 feet 1 inch. This variation represents a variation of less than one percent of the nominal lead length but even this minor variation is undesirable.

It is an object of the present invention to provide an improved wire feeding and measuring apparatus. A further object is to provide an improved wire feeding means for a lead making machine. A still further object is to provide wire feeding means capable, upon machining a relatively simple adjustment, of feeding any desired length of wire. A still further object is to provide a wire measuring and feeding means capable of feeding a predetermined length of wire with a high degree of precision and accuracy.

These and other objects of the invention are achieved in a preferred embodiment thereof which is described briefly in the foregoing abstract, which is described in detail in the following specification, and which is shown in the accompanying drawings in which:

FIG. 1 is a semischematic view of a wire feed system in accordance with the invention showing some of the elements of a lead making machine of the type disclosed in U.S. Pat. No. 3,019,679.

FIG. 2 is a semischematic view similar to FIG. 1, but omitting the electronic control system for the wire feed means, this Figure showing the positions of the parts at the beginning of the operating cycle.

FIGS. 3-7 are views similar to FIG. 2 but showing the positions of the parts at successive stages of the operating cycle.

FIG. 8 is a side view of the wire feed capstan of the feeding means in accordance with the invention and the other structure associated with the capstan.

FIG. 9 is a top view of the subassembly of FIG. 8.

Figure 10:
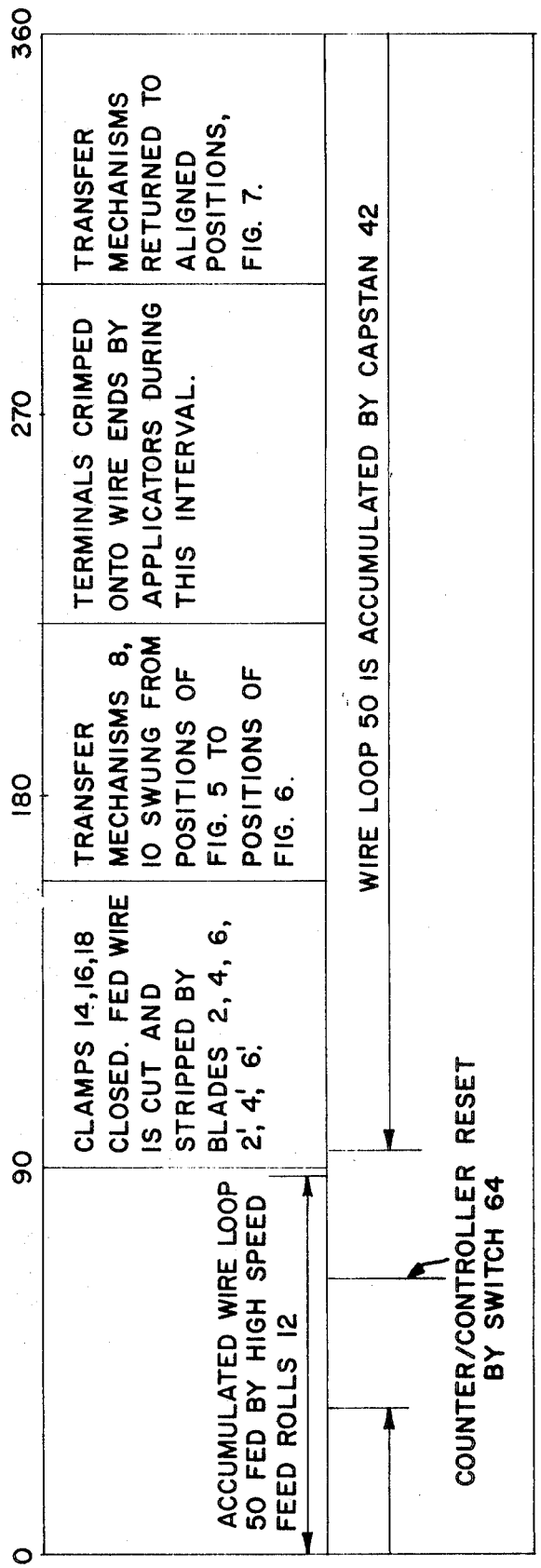

FIG. 10 is a timing diagram illustrating the operation of a feeding means in accordance with the invention when used in conjunction with the lead making machine of the general type disclosed in U.S. Pat. No. 3,019,679.

Figure 11:
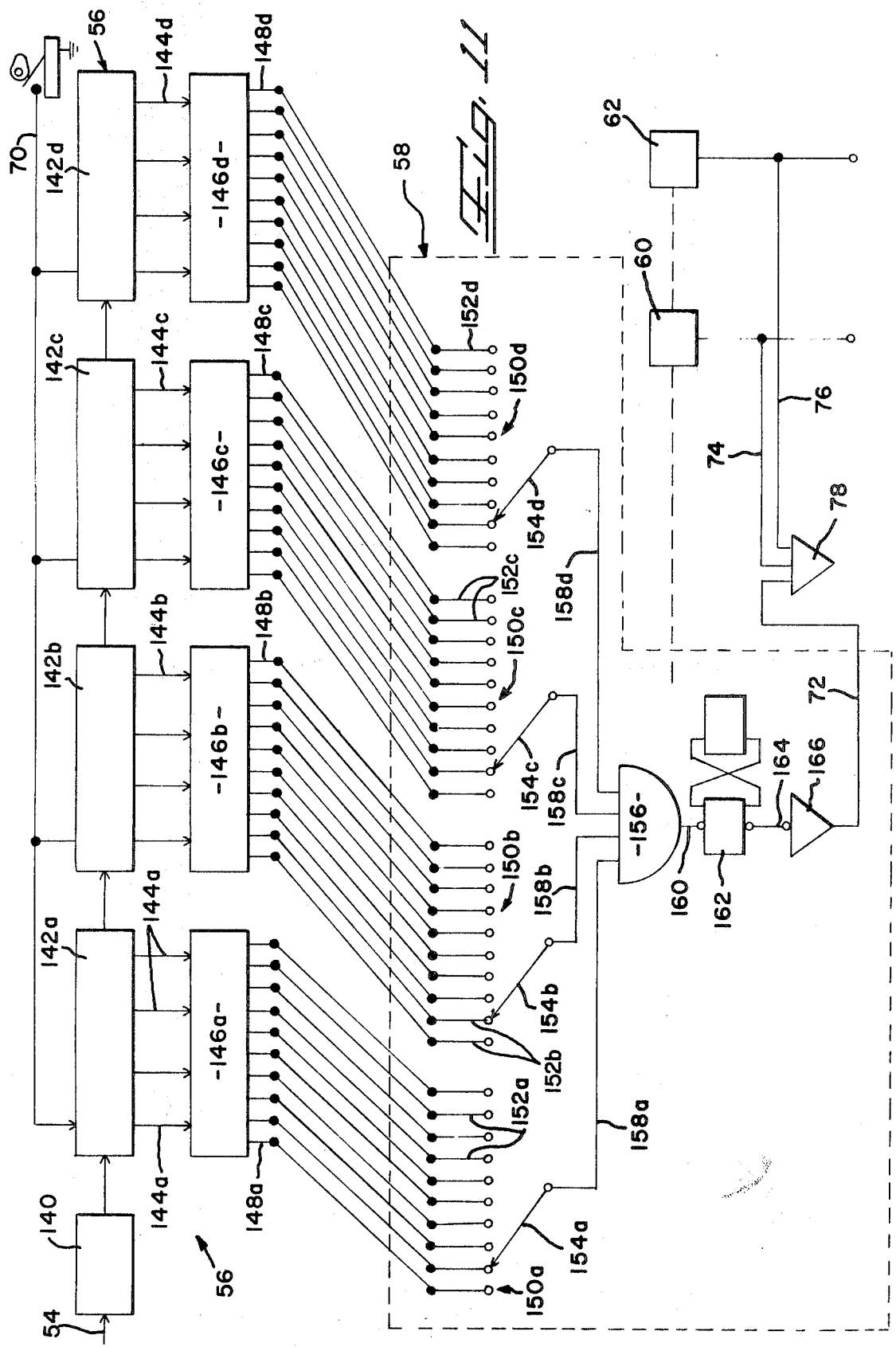

FIG. 11 is a schematic diagram of the wire feed control system.

Figure 1:
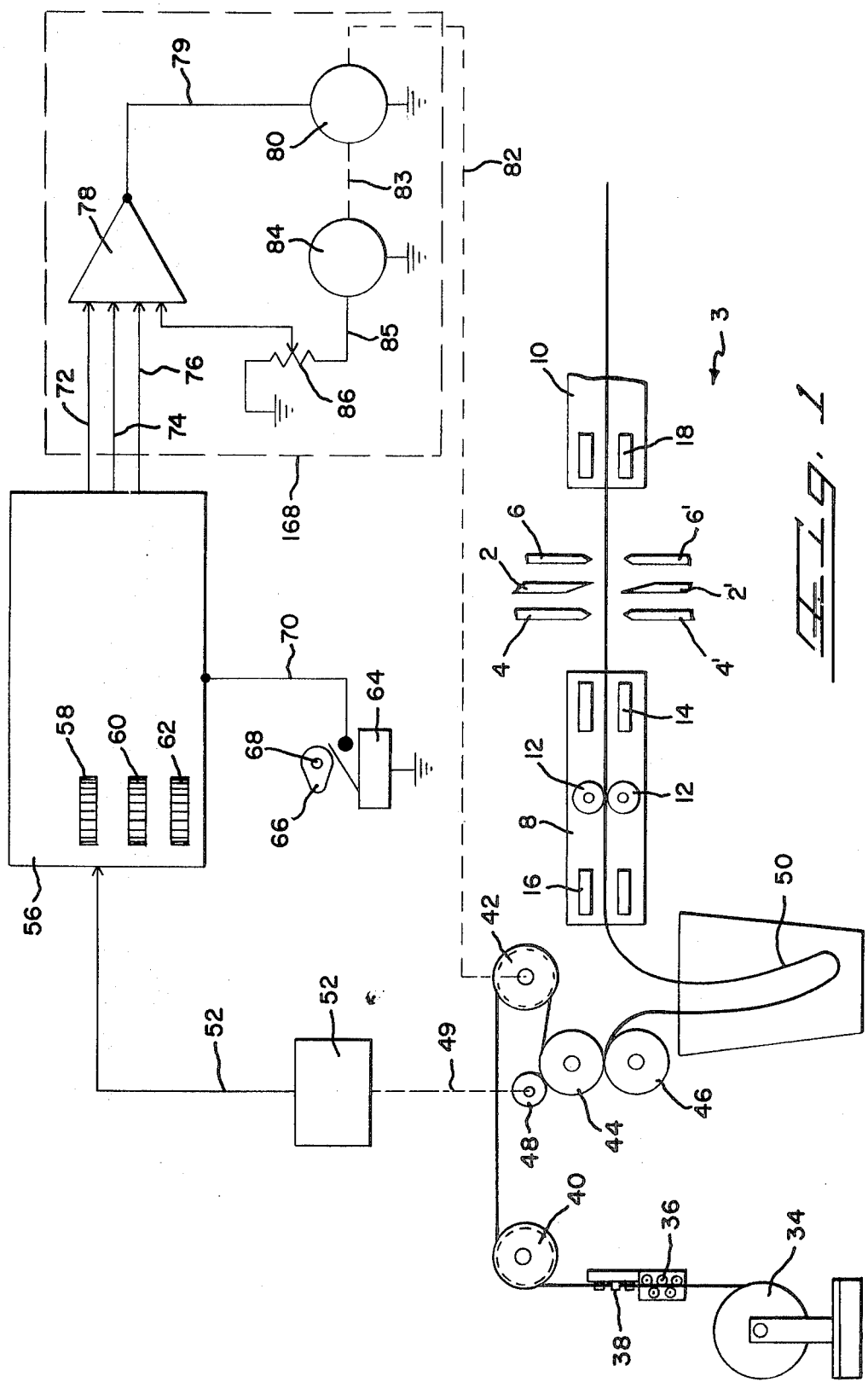

Referring first to FIG. 1, the reference numeral 3 denotes some of the essential structural elements of a lead making machine of the general type disclosed in the Schwalm et al. patent 3,019,679. These elements comprise a pair of cooperable wire severing blades 2, 2', and two pairs 4, 4'; 6, 6', of cooperable insulation cutting blades. Upon movement of the blades 2, 4, 6, 2', 4', 6' towards each other, a wire disposed therebetween is severed and the insulation on each side of the severing blades 2, 2' is circumferentially cut so that the wire end and the lead end can be stripped upon movement of the wire and lead axially away from the severing blades. A wire carrier or transfer mechanism 8 is provided on the left-hand side of the blades and a lead carrier or transfer mechanism 10 is provided on the right-hand side of the blades. A pair of high speed feed rolls 12 are mounted on the carrier 8 and two clamps 14, 16 are also mounted on the carrier on each side of the feed rolls. An additional clamp 18 is provided on the lead carrier 10.

At the beginning of an operating cycle, in which a complete terminated lead is produced, the clamps 14, 16, 18 will be open and the blades will be separated from each other as shown in FIG. 2. The high speed feed wheels 12 first feed wire from an accumulated loop 50 along a feed path which extends rightwardly, as viewed in FIGS. 2-7, until all of the slack wire of the loop has been fed as shown in FIG. 3. Rotation of the high speed feed rolls 12 is then stopped and the clamps 14, 16, 18 are closed concomitantly with the movement of the blade pairs 2, 2', 4, 4', and 6, 6' towards each other. While the blades are in their closed positions the clamp 14 and the clamp 18 move axially away from the blades as shown in FIG. 5. As a result of such movement of the clamps, the cut ends of the wire and lead are withdrawn from the blades and are stripped as shown at 24 and 26. Thereafter the carriers or transfer mechanism 8, 10 swing through minor arcs and present the stripped wire ends to terminal applicators indicated at 30 and 32 where terminals are applied to the stripped ends. The carriers then swing back to their normal positions (FIG. 7), the clamps are opened, and the completed lead, which appears at the right of FIG. 7, is carried or fed from the operating zone by a suitable ejection mechanism. The succeeding cycle is then initiated by the commencement of rotation of the high speed rolls 12.

The instant invention is directed to an improved wire measuring and feeding system adapted for use with the machine elements shown at 3 which functions to draw wire from an endless source, such as a reel 34, and accumulate the metered wire in the loop 50. It will be apparent that the amount of wire in this loop must be accurately predetermined and measured if the machine is to produce a succession of leads of accurately predetermined lengths within precise limits.

The measuring and feed mechanism in accordance with the invention comprises a capstan 42 which pulls wire from the reel 34 through conventional straightening rolls 36, 38 and over a guide pulley 40. The wire wrapped around the capstan for at least one and one-half complete turns and extends from the capstan over a driven follower wheel 44, thence between the follower wheel and a idler wheel 46 to the loop 50. The capstan is driven during a substantial portion of the cycle but is stopped for a brief interval after an accurately predetermined length of wire has been withdrawn from the reel 34. The instant invention includes the electronic control system for the capstan 42 which permits extremely accurate determination of the amount of wire in the loop 50.

The control system comprises a pulse generator 52 which is mounted on a shaft 49 on which a pulse generator roll 48 is also mounted. Roll 48 is in peripheral engagement with the driven follower wheel 44 and is rotated by this wheel during measuring and feeding of the wire by the capstan. The pulse generator roll causes the shaft 49 to rotate thereby generating a series of pulses, the total number of pulses generated having a fixed ratio to the amount of wire drawn from the reel by the capstan 42. The pulses are transmitted by a cable 54 to a counter/controller 56 which counts the number of pulses received and sends out a signal through one of three lines 72, 74, 76 to a servoamplifier 78. The function of the counter/controller is to control a printed circuit motor 80, which is coupled by a shaft and belt as indicated at 82, to the capstan 42, so as to stop rotation of the capstan after a predetermined length of wire has been accumulated in the loop 50. As will be apparent from the description which follows, the counter controller reduces the speed of the capstan during the feeding process so that the speed of the wire feeding operation is gradually reduced before it is completely stopped.

Referring to FIG. 11, the counter/controller comprises a pulse shaper 140 which receives and shapes the pulses from the pulse generator, and four cascade connected decade counters 142a, 142b, 142c, 142d which receive and count the pulses of the series. The provision of four decade counters permits the counting of up to 9,999 pulses so that the maximum lead length which can be measured is 9,999 the increment of wire length which is the equivalent of one pulse. The counters 142a–142d have conventional four-lead binary coded outputs, indicated at 144a–144d which extend to decoders 146a–146d. The decoders translate the coded input signals into decimal signals on ten output leads, 148a–148d.

Each of the 10 output leads 148a–148d of each of the decoders 146a–146d are connected in parallel to the corresponding terminals 152a–152d of three identical switch means 58, 60, 62. Since these switch means are identical, a description of one will suffice for all three. Accordingly, only the switch means 58 will be described in detail. The manner in which these switch means cooperate to control the wire feed will be described below.

The switch means 58 comprises four individual thumbwheel switches 150a–150d each of which has 10 input terminals indicated at 152a–152d. Each of the 10 input terminals of switch 150a, representing 0 to 9, are connected to their digital counterparts 148a of the decoder 146a. The input terminals of the switches 150b, 150c, 150d are similarly connected to the output terminals of the decoders 146b, 146c, 146d respectively.

The selective contacting means, 154a of the thumbwheel switch 150a, which is controlled by the thumbwheel, can be engaged with any one of the input terminals 152a thereby to permit transmission of a signal to an "AND" gate 156 when the preselected number of pulses have been counted. The selective contacting means 154b, 154c, 154d of the thumbwheel switches 150b, 150c, 150d can similarly be engaged with any of the 10 input terminals 152b, 152c, 152d of the three remaining switches.

The "AND" gate 156 will transmit a signal through a conductor 160 to set a storage flip-flop 162 only when it is receiving a signal through each of the lines 158a–158d from each of the switches 150a–150d. The signal emitted by the "AND" gate is stored in the flip-flop until the preset number of pulses have been counted and the flip-flop of the switch means 58 and the switch means 60 and 62, have been reset as described below. The signal from the storage flip-flop 162 is transmitted through a cable 164 to an output amplifier 166 thence through the cable 72 to the previously identified servoamplifier 78.

As previously mentioned, the switch means 60, 62 are identical to the switch means 58. The switch means 60, 62 thus comprise four thumbwheel switches having input terminals which are connected to the decimal outputs 148a–148d of the decoders 146a–146d. The output signals from the output amplifiers of the switch means 60, 62 are transmitted by the cables 74, 76 to the servoamplifier 78.

The counter/controller 56, in cooperation with the circuitry indicated at 168 (FIG. 1), is effective to control the printed circuit motor 80 which is mechanically coupled, as indicated at 82, to the capstan 42. This control system permits accurate determination of lead length and additionally, functions to reduce the speed of the capstan towards the end of a feeding cycle in two distinct steps.

The circuitry and mechanical elements indicated at 168 are described in detail in U.S. Pat. No. 3,458,787, and need be described only briefly here. This control system thus comprises the servoamplifier 78, the output signal of which is transmitted by a cable 79 to the printed circuit motor 80. This motor is mechanically coupled to the capstan as indicated at 82 so that it drives the capstan. Printed circuit motor 80 is also coupled at 83 to a tachometer 84 which produces a signal in a cable 85 extending to a calibrating resistor 86 and the signal from the calibrating resistor is transmitted to the servoamplifier 78. The tachometer monitors the speed of the printed circuit motor in the manner of a governor and ensures that the rotational speed of the printed circuit motor is at the high, medium, or low level being called for by the signal from the counter/controller 56. In accordance with the teachings of the above-identified Grebe et al. patent, the printed circuit motor 80 will rotate at its highest speed if a signal is received through cable 72, will rotate at its intermediate speed if a signal is received only through cable 74, and will rotate at its lowest speed if a signal is received only through cable 76. The printed circuit motor is stopped when no signals are received.

The apparatus is set by the operator to produce leads of a given length as follows. Assuming that each pulse is equivalent to 0.1 inches of wire and that the operator wishes to set the apparatus to produce 60 inch leads, he first sets the thumbwheel switches of the switch means 158a to 600. The operator then determines the point during the wire feeding cycle at which he wishes the printed circuit motor to shift from its high speed to its medium speed. Assuming that he wishes to effect this speed change after 57 inches of wire have been fed, he sets the thumbwheel switches of the switch means 60 at a number corresponding to an equivalent number of pulses, in this case 570 pulses. Finally, he determines the point in feeding cycle at which the speed of the capstan should be reduced to its lowest level and makes the appropriate setting on the thumbwheel switches of the switch means 62. Thus, if the speed is to be reduced to its lower level after feeding of 59.8 inches of wire, the thumbwheel switches of the switch means 62 are set at 598.

The counter/controller must be reset during each operating cycle of the machine after the wire required for one electrical lead has been measured and accumulated in the loop and prior to commencement of rotation of capstan for the wire required for the next succeeding cycle. Such resetting of the counter/controller is achieved by a reset switch 64 which is closed during each cycle of the lead making machine by a cam 66 mounted on a camshaft 68. FIG. 3, of the above-identified U.S. Pat. No. 3,019,679, shows a switch of this type which is closed once during each complete operating cycle of the machine at 357.

A variety of types of counters can be used in the practice of the invention and it is not deemed necessary to describe specific circuitry for the counter/controller 56. For example, an Emerson Electric Company Accra-Count Model SS preset indicator/controller can be employed if desired. Devices of this type are commonly used in the control circuitry and are available from a number of manufacturers.

The servoamplifier 78 is of the type fully shown and disclosed in the previously identified U.S. Pat. No. 3,458,787. It may be noted that the control system shown in the above identified Grebe et al. Patent shows in FIG. 8 circuitry for controlling feeding, or other movement, in either of two directions whereas the instant device requires only that the wire be fed in only one direction. It follows that the reversing circuitry shown in application Ser. No. 532,014, can be eliminated from the servoamplifier 78 of the instant disclosure.

Referring now to FIG. 10 the abscissa represents a complete rotation of the main power shaft of the lead making machine, the crimping of the terminals onto the stripped ends of the wires taking place 180° after the commencement of the cycle. At the beginning of the cycle, both the capstan and the high speed feed rolls are rotating so that wire is being drawn from the reel 34 and wire is also being withdrawn from the loop 50 and projected through the lead making machine. The capstan is stopped after about 30° of rotation of the main power shaft of the lead making machine and the high speed rolls continue to rotate for a very brief interval, about 5° of rotation of the main power shaft of the lead making machine, after the cessation of rotation of the capstan. It is desirable to permit the high speed rolls to rotate for a brief period following the cessation of operation of the capstan in order to ensure that all of the wire has been fed from the loop and that the wire is stretched taut from the rolls 44, 46. The clamps 14, 16, 18 then close on the stationary wire in the carriers or transfer mechanisms 8, 10 are swung as shown in FIGS. 2–7 to present the stripped wire and lead ends to the terminating machines and return to their initial positions.

The reset switch 64 is closed after about 90° of rotation of the main power shaft, that is, during swinging of the carriers 8, 10, and the capstan commences to withdraw wire from the reel for the next operating cycle. The capstan feed thus proceeds for about 330° of rotation of the main power shaft. The high speed feed rolls commence to rotate after opening the clamps 14, 16, 18 towards the end of the operating cycle and continue to rotate during the initial portion of the next operating cycle. These high speed rolls do not meter the wire which they feed but must have the capability of feeding all of the accumulated wire in the loop 50 during a brief interval. Towards the end of their feeding cycle, these rolls will slip relative to the wire and maintain it in a taut condition while the clamps close.

A distinct advantage of the invention is that leads of precisely predetermined lengths can be produced because of the high degree of control of the capstan by the counter/controller. In a preferred embodiment of the invention, for example, each pulse produced by the pulse counter 52 represents 0.1 inch of wire so that precision of ±0.1" can be achieved regardless of the lengths of the leads produced.

A further salient advantage of the invention is that the length of the leads being produced by the machine can be changed by an unskilled operator in only the amount of time required to reset the switches 58, 60, 62. In the prior art system, it was necessary to make changes in both the sliding gear transmission and the infinitely variable transmission to change the length of the leads produced. Finally, it should be noted that the metering and feeding system of the instant invention is much more compact and can be produced at a substantially reduced cost as compared with the metering and feeding system shown in the previously identified U.S. Pat. No. 3,098,596.

Referring now to FIGS. 8 and 9, a specific structural embodiment of the capstan and its associated rolls, pulleys, and pulse counter may be mounted on a suitable plate 88 supported by a standard 90. The previously identified straightening rolls 36, 38 are supported on a bracket secured to the side of the plate and the guide pulley 40 is mounted on a shaft 96 immediately above the straightening rolls. The capstan 42 is mounted on a shaft 92 which extends through the plate, through suitable bearing boss means 100, and has a gear 102 and a sprocket 104 on its end. The sprocket 104 is coupled by means of a timing belt 106 to the printed circuit motor 80 and the gear 102 meshes with a gear on the shaft 114 on which the follower wheel 44 is mounted. The gears 102 and 112 are identical to each other so that the follower wheel rotates at the same speed as the sprocket.

Advantageously, a bellcrank 128 is pivotally mounted at 130 adjacent to the capstan 42 and has a roller 132 on the one arm thereof. This roller is dimensioned to fit between the flanges of the capstan to maintain the turns of wire on the capstan surface beside each other and to prevent them from overlapping. The downwardly extending arm 134 of the capstan is adjustably connected to a bracket 136 by a screw 138 to permit adjustment of the position of the roller. A spring 140 is interposed between the lower end of the arm 134 and the bracket to maintain the bellcrank in its adjusted position. Additionally, a pair of straightening rolls or guide rolls 116 are mounted between the capstan and the follower wheel 44 on an arm 118. These rolls merely serve to guide the wire accurately towards the follower wheel. The idler wheel 46 is rotatably mounted on a shaft 120 which in turn is eccentrically mounted at 122 on the plate 88. A spring 124 has one end attached to a pin in the plate and has its other end attached to a pin in the shaft 120 so that this follower wheel 46 is resiliently biased against the surface of the follower wheel 44. The pulse counter wheel 48 is similarly resiliently biased against the surface of the follower wheel 44 in that it is mounted on an arm which is pivoted to the plate, the arm being biased in a clockwise direction as viewed in FIG. 8 by means of a spring as shown. The shaft on which the wheel 48 is mounted extends through the plate and into the pulse counter 52 as shown in FIG. 9.

It should be emphasized that while the invention has been specifically described with reference to a lead making machine of the type shown in the above-identified Schwalm et al. patent, feeding and metering devices in accordance with the invention will find utility in other environments. Particularly, wherever it is desired to feed, during an extremely brief interval, a relatively long length of wire, a control system including electronic controls and a capstan in accordance with the invention can be used to advantage. It should also be mentioned that while the capstan 42 is a preferred method of pulling wire from the wheel, any nonslipping means such as a simple set of rolls can be used if desired.

Changes in construction will occur to those skilled in the art and various apparently different modifications and embodiments may be made without departing from the scope of the invention. The matter set forth in the foregoing description and accompanying drawings is offered by way of illustration only.

We claim:

1. In a machine for intermittently feeding wire from a substantially endless source to a lead making machine or the like in which the wire is withdrawn from the source by withdrawing means during a first time period and the wire so withdrawn is fed by high speed rolls during a second time period commencing just prior to the end of the first time period, said machine including means for driving the withdrawing means comprising a motor, pulse generating means effective during operation of the withdrawing means to generate a train of regularly recurring pulses, the number of pulses bearing a direct ratio to the length of wire withdrawn from the source, and means adjustably responsive to a selected plurality of pulses produced by the pulse generating means for discontinuing operation of the withdrawing means.

2. Apparatus as set forth in claim 1 wherein said wire withdrawing means comprises a capstan.

3. Apparatus as set forth in claim 1 wherein said pulse generating means comprises roll means and a rotary pulse generator means, said roll means being in engagement with said wire when said wire is withdrawn from said source, said roll means being coupled to said rotary pulse generating means to rotate said generating means during withdrawal of said wire.

4. Apparatus as set forth in claim 1 wherein said control means comprises counter/controller means, said counter/controller means being settable to stop said wire withdrawing means after counting of selected numbers of pulses to thereby determine the length of wire fed.

5. Apparatus as set forth in claim 4, including means for cyclically resetting the counter/controller means.